United States Patent
Arai

[19]

[11] Patent Number: 5,892,651

[45] Date of Patent: Apr. 6, 1999

[54] SLIDE TRAY HAVING A ROLLING CONDUCTIVE PATH

[75] Inventor: Toshiyuki Arai, Kanagawa, Japan

[73] Assignee: Sony Corporation, Tokyo, Japan

[21] Appl. No.: 802,073

[22] Filed: Feb. 19, 1997

[30] Foreign Application Priority Data

Feb. 28, 1996 [JP] Japan ..................................... 8-065206

[51] Int. Cl.⁶ ....................................................... H05F 3/02
[52] U.S. Cl. ........................... 361/221; 361/212; 361/727
[58] Field of Search .................................... 361/212, 214, 361/220, 221, 683–685, 725–727, 816, 818; 307/100; 369/75.1

[56] References Cited

U.S. PATENT DOCUMENTS 2,216,363  10/1940  Crawford ................................. 361/221
2,786,161   3/1957  Lunden ................................ 361/221 X

*Primary Examiner*—Lynn D. Feild
*Attorney, Agent, or Firm*—Limbach & Limbach L.L.P.

[57] ABSTRACT

An electronic apparatus in which grounding can be achieved between a casing of the main body portion of the apparatus and a slide tray mounted on the casing for being extracted forwards via an opening surface of the casing. To this end, the electronic apparatus includes a slide tray 3 mounted on the casing 2 of the main body portion of the apparatus for being extracted forwards via an opening surface 7 of the casing and carrying electrical components in need of electrical conduction with respect to the main body portion, and an electrically conductive ejection plate 9 electrically conductively connected with an electrically conductive main body portion of a tray 6 and supported on the slide tray for movement in the fore-and-aft direction. The electronic apparatus also includes an electrically conductive roll 17 supported via an electrically conductive spring plate 15 on the ejection plate 9 and adapted for rolling on an electrically conductive bottom plate 18 of the casing of the main body portion.

4 Claims, 9 Drawing Sheets

SLIDE TRAY HAVING A ROLLING CONDUCTIVE PATH

BACKGROUND OF THE INVENTION

1. Field of the Invention

This invention relates to a grounding structure in a novel slide tray. More particularly, it relates to a technique whereby electrical components loaded on a slide tray can be grounded to a main body portion with the slide tray having been pulled forward via an opening surface of a casing of the main body portion.

2. Description of the Related Art

A certain type of electronic equipment, such as an optical disc reproducing apparatus, has a tray that can be pulled out of the casing of the main body portion thereof.

In a certain type of optical disc reproducing apparatus, electrical components, such as an optical pickup or a feed motor, in addition to a spindle motor, are loaded on the slide tray for reducing the thickness, or height, of the overall apparatus. In such slide tray, the electrical components need to be grounded to the side of a main body portion of the apparatus.

If, in the state in which the slide tray a has been pulled out of the casing b of the main body portion, the slide tray a and the casing b have overlapping portions c shown shaded in FIG. 1, the contact portions of the slide tray a and the casing b may be formed of an electrically conductive material in the overlapping portion c for grounding the electrical components to the main body portion via the contact portion.

If the overlapping portion c is provided between the slide tray a and the casing b, since it is necessary to enable mounting/dismounting operations to be carried out in the pulled out state of the slide tray, the overlapping portion c represents a redundant portion. The size of the slide tray a is increased in depth by an amount corresponding to the overlapping portion c thus increasing in depth of the casing of the main body portion housing the tray.

For reducing in depth of the optical disc reproducing apparatus, it has been envisaged to use slide rails d, d, as shown in FIG. 2.

Specifically, the slide rails d, d, slidably supported on both lateral sides of the slide tray a, are slidably supported on both inner lateral sides of casing b, b for supporting the slide tray a on the casing b so that the slide tray a can be pulled forward via an opening surface e.

By so doing, no overlapping portion is left between the slide tray a and the casing b, when the slide tray a has been pulled out of the casing b on the main body portion, thus reducing depth of the apparatus.

Meanwhile, there is a problem if, with the use of the slide rails d, d, these slide rails are formed of electrically conductive metal.

That is, since there is no overlapping portion between the slide tray a and the casing b, when the slide tray a has been pulled out of the casing b, it may be contemplated to form the lateral sides of the slide rail a and the inner lateral sides of the casing b of an electrically conductive metal and to form the slide rails d, d of an electrically conducive metal for enabling electrical conduction between the slide tray a and the casing via slide rails d, d for grounding the electrical components loaded on the slide tray a, as shown in FIG. 2.

However, if the slide contact members a, b, d and d are formed of electrically conducive metal, fine chips of these components are produced due to sliding contact between the components a, b, d, d, as a result of repeated sliding movements of the slide tray a. Since these chips are electrically conductive, they become attached to conductors of the circuit to produce shorting.

For preventing the electrically conductive chips from being produced and for improving sliding properties, the slide rails d, d need to be formed of electrically nonconductive materials, such as synthetic resin.

If the slide rails d, d are formed of electrically nonconductive materials, the electrically conductive chips are prevented from being produced and the sliding performance can be raised. However, electrical conduction cannot be maintained between the slide tray a and the casing b, such that it becomes impossible to assure grounding of the electrical components loaded on the slide tray.

Since a flexible printed circuit board is used as electrical feed means for the electrical components loaded on the slide tray a, grounding may be realized through the flexible printed circuit board. However, due to various constraints, grounding through the flexible printed circuit board leads to shortage in capacity, such that sufficient grounding cannot be assured.

SUMMARY OF THE INVENTION

It is therefore an object of the present invention to provide a grounding structure for achieving grounding between a casing of a main body portion and a slide tray mounted on the casing of the main body portion for extraction forward via an opening surface of the casing of the main body portion.

It is another object of the present invention to provide electronic equipment carrying a slide tray on a casing of the main body portion for extraction forward via an opening surface, in which an operator may be advised of the extraction of the slide tray to a pre-set position out of the casing by his or her tactile feel.

It is yet another object of the present invention to provide electronic equipment extractably carrying a slide tray on a casing of the main body portion whereby resistance against shock may be improved and lower power consumption may be achieved.

The present invention provides an electronic apparatus having an-electrically conductive member provided on a casing, an electrically conductive member provided on a slide tray for being electrically connected with electrical components, and grounding means formed of an electrically conductive material. The grounding means is supported on one of the electrically conductive members of the casing and the electrically conductive member of the slide tray for sliding in the direction of extraction of the slide tray in electrically conductive relation therewith and is electrically contacted with the other of the electrically conductive members of the casing and the electrically conductive member of the slide tray.

Thus, the electrical components loaded on the slide tray may be grounded with respect to the casing of the main body portion via the grounding means with the slide tray having been extracted from the casing of the main body portion.

In addition, the present invention provides an electronic apparatus including a resilient member slidably mounted on one of the casings of the main body portion and the slide tray for sliding in the direction of extraction of the slide tray and resiliently contacted with the other of the casings of the main body portion and the slide tray, and a biasing member biasing the resilient member in a direction of extracting the slide tray out of the casing of the main body portion when the slide tray is held in the housed position in the casing of the main body portion. An engagement hole or engagement recess is formed in the other of the casing of the main body portion and the slide tray or the resilient member, while an engagement member engaged with the engagement hole or engagement recess is provided in the resilient member or the other of the casing of the main body portion and the slide tray. The engagement member is engaged with the engagement hole or engagement recess when the slide tray has been extracted from the casing.

Thus, when the slide tray has been extracted to a pre-set position from the casing of the main body portion, the engagement member is engaged with the engagement hole or engagement recess to produce a light impact which imparts a "click" feeling to the user.

For releasing the lock of the slide tray in the receded position in the casing of the main body portion, a dc motor is used as a driving source.

The result is reduced power consumption and improved shock-proofness.

DESCRIPTION OF THE PREFERRED EMBODIMENTS

Figure 1:
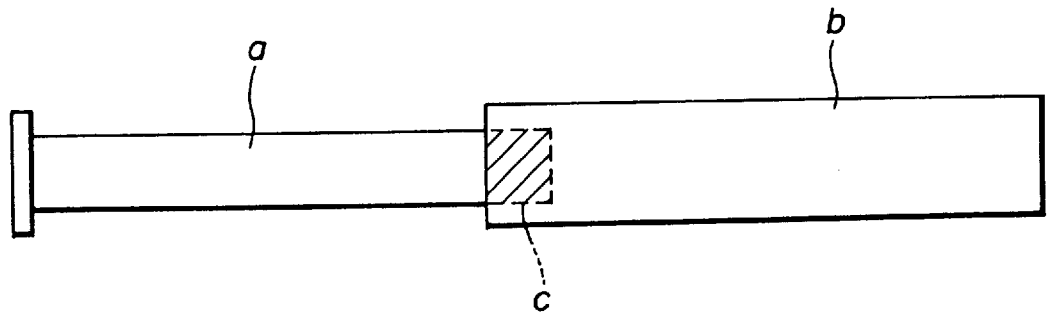
FIG. 1 is a schematic side view showing a conventional optical disc reproducing apparatus.
Figure 2:
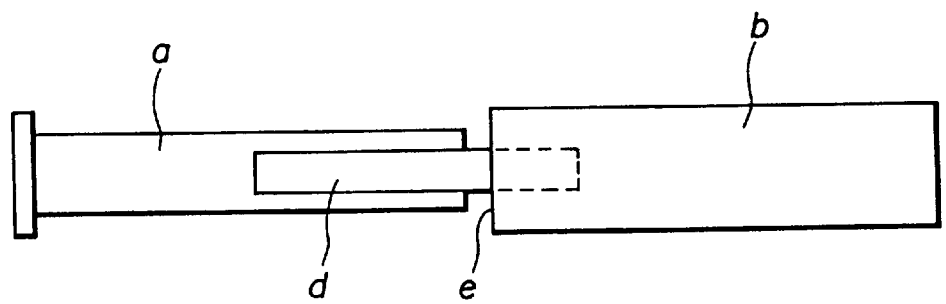
FIG. 2 is a schematic side view showing another conventional optical disc reproducing apparatus improved over the apparatus shown in FIG. 1.

Referring to the drawings, preferred embodiments of the electronic equipment according to the present invention will be explained in detail. In the following embodiments, the present invention is applied to an optical disc reproducing apparatus.

FIGS. 3 to 16 illustrate a first embodiment of electronic equipment according to the present invention.

An optical disc reproducing apparatus 1 is used as a CD-ROM for a notebook type personal computer and is comprised of a casing of a main body portion 2 and a slide tray 3 that my be receded into and pulled out of the casing of the main body portion 2.

At a mid portion on the upper surface of the slide tray 3 is protuberantly formed a spindle 4 fitted with chuck means, not shown. In addition, there are provided electrical components, such as optical pickup, spindle motor and a feed motor for the optical pickup, although not shown. The slide tray 3 has a front side plate 5 slightly larger in size than the front surface of a main body portion of the tray 6, so that, when the slide tray 3 is housed within the casing of the main body portion 2, the front side plate 5 completely closes an opening surface 7 of the casing of the main body portion 2.

The main body portion of the tray 6 is formed of an electrically conductive material. It is to this main body portion of the tray 6 that the electrical components are grounded.

Figure 3:
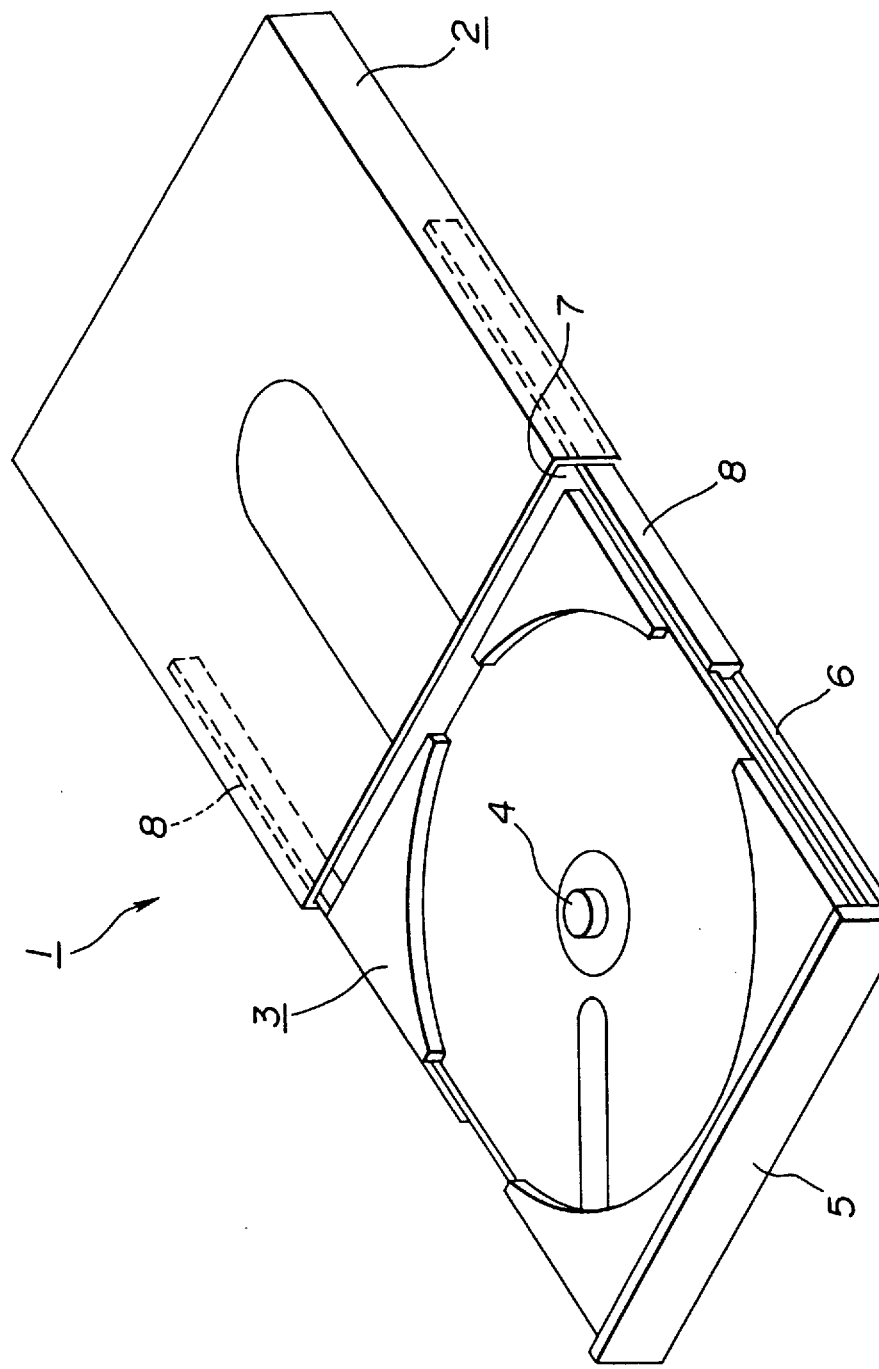
FIG. 3, taken together with FIGS. 4 to 14, shows a first embodiment of a grounding structure for a slide rail according to the present invention, and is specifically schematic perspective view showing the state in which the slide tray has been pulled out of a casing on a main body portion of the equipment.
Figure 4:
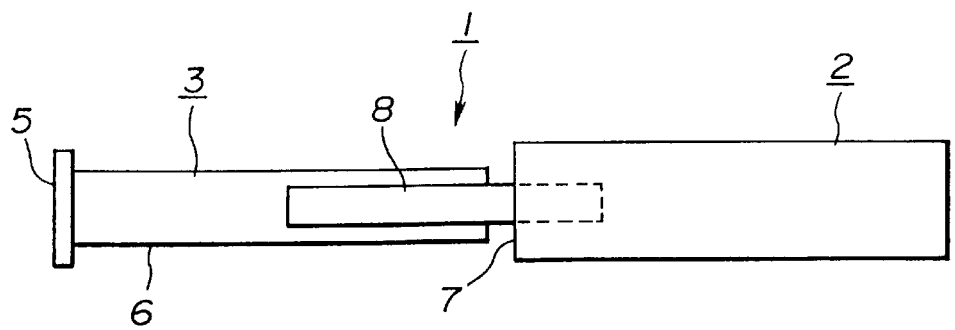
FIG. 4 is a schematic side view showing the slide tray pulled out of the casing on the main body portion of the equipment.
Figure 5A:
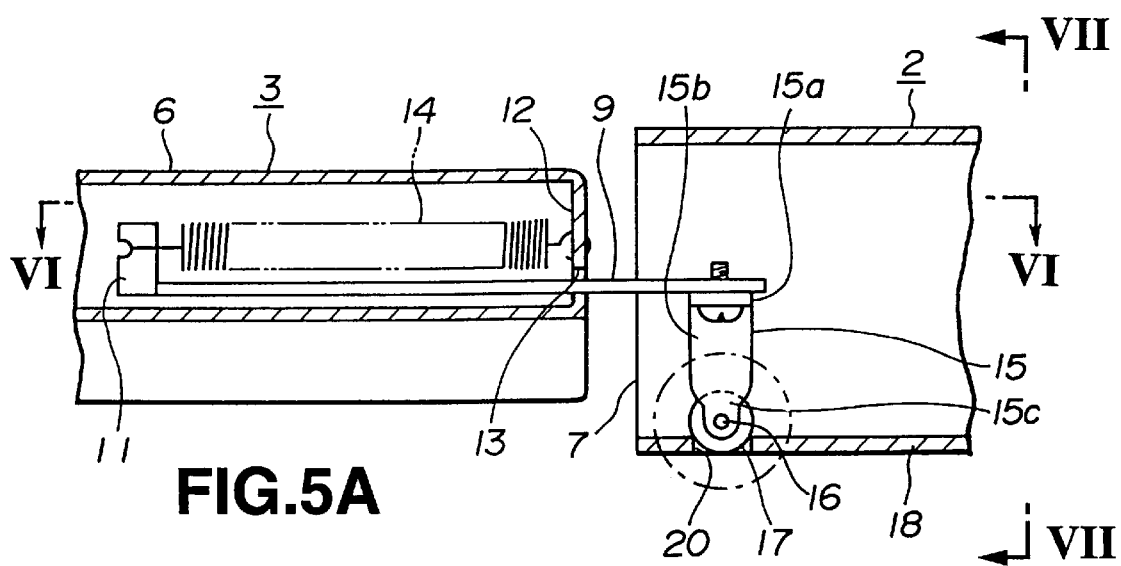
FIG. 5A is an enlarged cross-sectional view showing essential portions of the slide tray pulled out of the casing on the main body portion of the equipment.
Figure 5B:
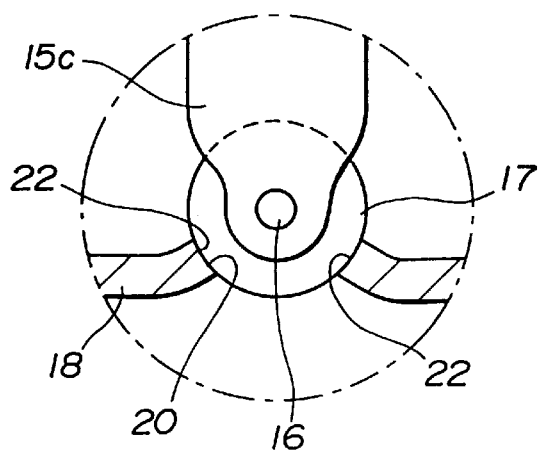
FIG. 5B is an enlarged cross sectional view of the roll shown in FIG. 5A.
Figure 6:
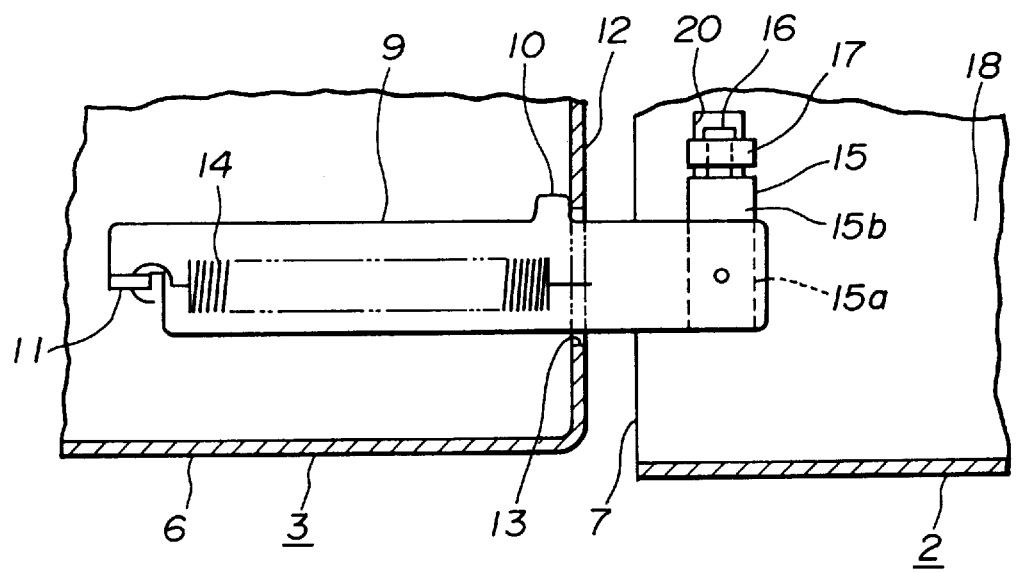
FIG. 6 is a cross-sectional view taken along line VI—VI of FIG.5.
Figure 7:
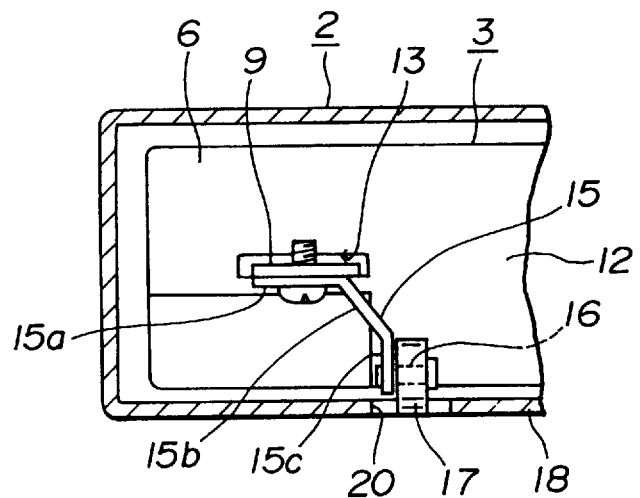
FIG. 7 is a cross-sectional view taken along line VII—VII of FIG. 5.

A pair of slide rails 8, 8, formed of synthetic resin in the shape of elongated plates, are slidably supported on both lateral sides of the main body portion 6 of the slide tray 3. These slide rails 8, 8 are slidably supported on both inner lateral sides of the casing of the main body portion 2. Thus, the slide tray 3 is supported via slide rails 8, 8 for being receded and housed in the casing of the main body portion 2 or pulled out to a position ahead of the opening surface 7 of the casing of the main body portion 2, as shown in FIG. 3.

An ejection plate 9 is formed by an elongated electrically conductive metal plate extending in the fore-and-aft direction. At a mid to rear portion of the ejection plate 9 is formed a stop lug 10. At the foremost part of the ejection plate 9 is formed an upstanding spring retainer 11. The ejection plate 9 is supported on the rear end of the slide tray 3 for sliding in the fore-and-aft direction. The slide tray 3 has a rear wall section 12 having an insertion through-hole 13 by which the ejection plate 9 is projected rearwards. A resilient member 14 in the form of a coil spring 14 is installed under tension between the rear wall section 12 of the slide tray 3 and the spring retainer 11 for biasing the ejection plate 9 rearwards. The ejection plate 9 is projected in this manner rearwards from the rear wall section 12 until the stop lug 10 is abutted against the inner opening edge of the insertion through-hole 13.

The ejection plate 9 is kept in an electrically conductive state with the main body portion of the tray 6.

On the rear end of the ejection plate 9 is secured a spring plate 15 formed of an electrically conductive spring plate material. The spring plate 15 has a supported portion 15a extending substantially horizontally, an intermediate portion 15b extending obliquely downwards from one end of the supported portion 15a and a supporting portion 15c extending downwards from the lower end of the intermediate portion 15b. The supported portion 15a is screwed to the rear end of the ejection plate 9 and kept in an electrically conductive state with the ejection plate 9.

The supporting portion 15c carries a laterally extending shaft 16 formed of an electrically conductive metallic material. On the shaft 16 is rotatably supported a roll 17 similarly formed of an electrically conductive metallic material. The roll 17 is resiliently contacted with a bottom plate 18 of the casing 2 under the spring force of the spring plate 15.

Since the casing 2 is formed of the electrically conductive metallic material, the electrical components loaded on the slide tray 3 is grounded to the casing 2 via the main body portion of the tray 6, ejection plate 9, spring plate 15, shaft 16 and the roll 17.

There is no necessity that the casing 2 be formed in its entirety of an electrically conductive material, such that it is A only sufficient if only the bottom plate 18 or the portion of the casing 2 contacted with the roll 17 when the slide tray 3 has been pulled out of the casing 2 be electrically conductive so that the electrical members are effectively grounded via the electrically conductive portion of the casing 2.

Although the roll 17 is contacted with the bottom plate 18 in the above-described structure, the spring plate 15 may be directly contacted with the bottom plate 18 without employing the roll 17. However, if the spring plate 15 is directly contacted with the bottom plate 18, electrically conductive metal chips are produced by sliding contact between the two thus leading to circuit shorting. By having the roll contacted with the bottom plate, it becomes possible to prevent generation of the electrically conductive metal chips.

The bottom plate 18 of the casing 2 is formed with engagement holes 19, 20 at the rear and foremost ends thereof in register with the path of rolling movement of the roll 17.

Figure 8A:
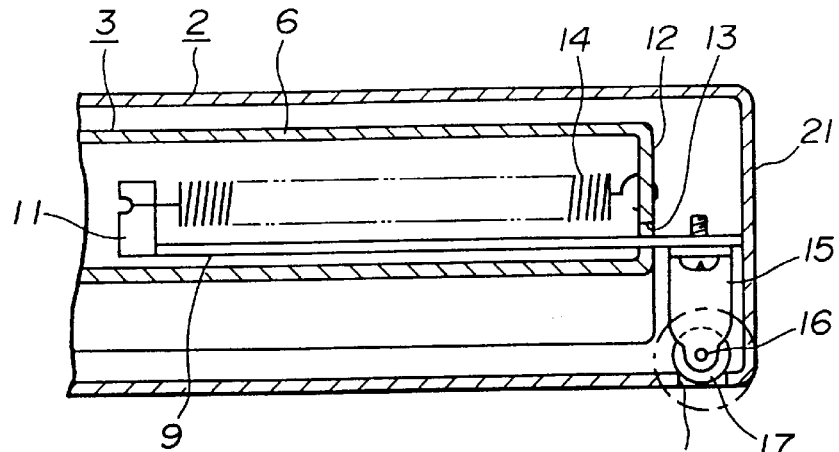
FIG. 8A is an enlarged cross-sectional view showing essential portions of the slide tray receded into the casing on the main body portion of the equipment.
Figure 8B:
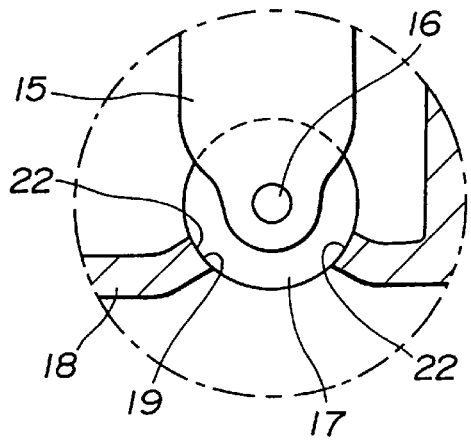
FIG. 8B is an enlarged cross sectional view of the roll shown in FIG. 8A.

When the slide tray 3 is housed within the casing 2, the rear end of the ejection plate 9 is abutted against a rear surface plate 21 of the casing 2. As the slide tray 3 is further intruded into the inside of the casing 2, the ejection plate 9 is relatively thrust forward by the rear surface plate 21 so as to be intruded into the slide tray 3, as shown in FIG. 8. The resilient member 14 is correspondingly extended for accumulating the resilient force. The roll 17 is engaged at this time with the engagement hole 19. Referring to FIG. 8, the slide tray 3, housed in the casing 2, is locked by lock means as later explained and thereby prohibited from making forward movement unless the lock by the lock means is released.

If the lock of the slide tray 3 in the housed position by the lock means is released, the resilient force accumulated in the resilient member 14 acts for thrusting the rear surface plate 21 of the casing 2 by the rear end of the ejection plate 9. This causes the slide tray 3 to be moved in the pull-out direction, that is in a direction in which the slide tray is pulled out of the casing 2. The stroke of movement is limited substantially to the amount of rearward protrusion of the ejection plate 9 from the rear end of the slide tray 3. That is, since the roll 17 provided at the rear end of the ejection plate 9 is engaged with the-engagement hole 19 of the casing 2, the protrusion of the slide tray 3 exceeding the above limit under the resilient force accumulated in the resilient member 14 is prohibited. This prevents the occurrence of a non-desirable phenomenon of the slide tray 3 being protruded out of the casing 2 without limitations under the resilient force.

Figure 9:
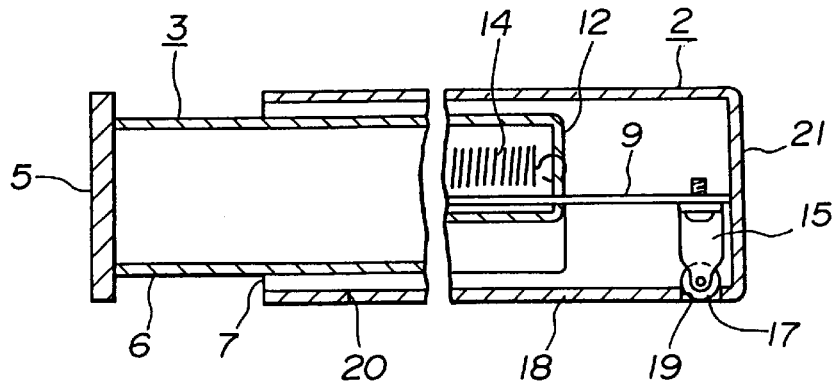
FIG. 9 is a partial schematic cross-sectional view showing the locked state of the slide tray in the receded position having been released.
Figure 10:
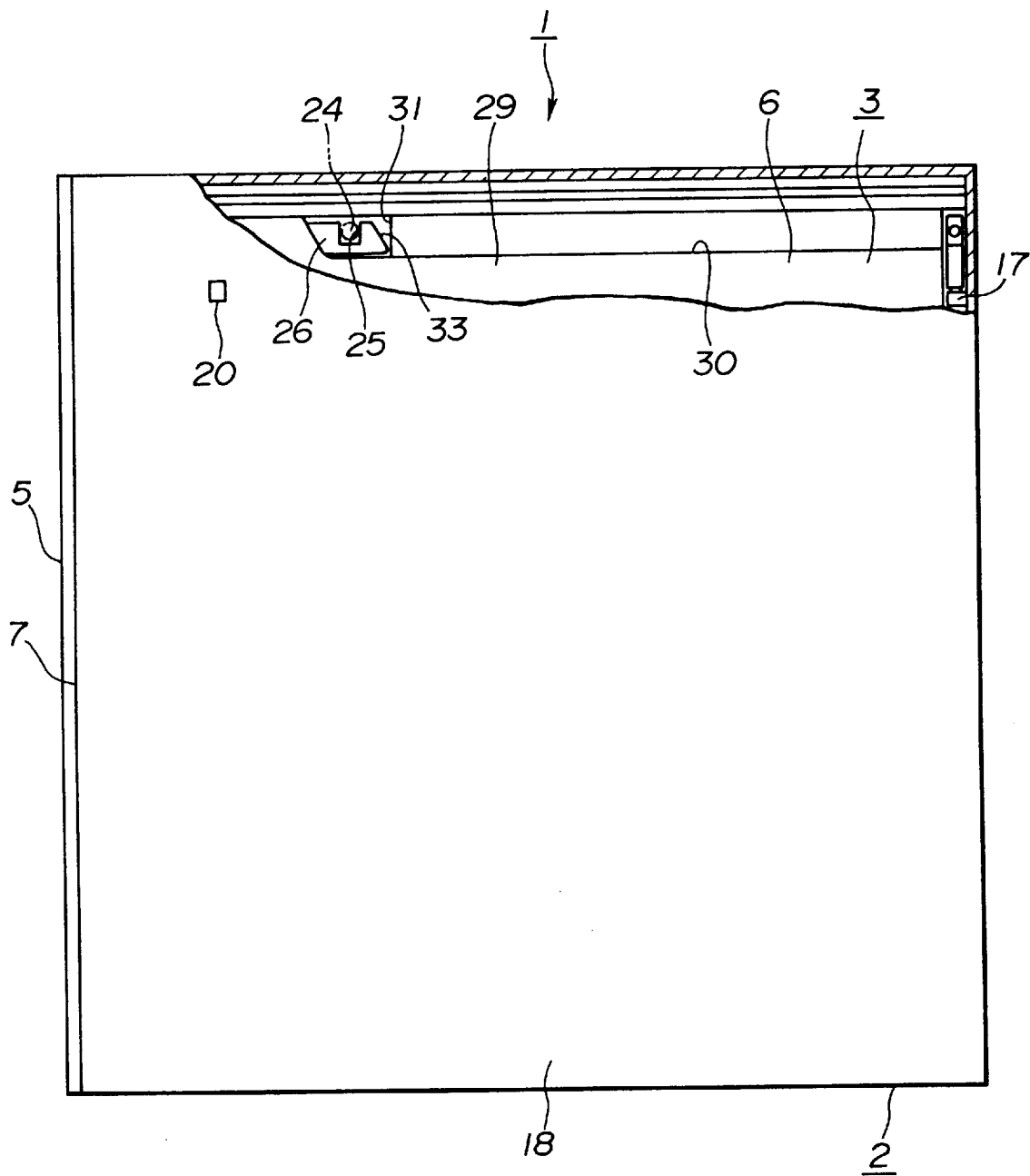
FIG. 10, taken together with FIGS. 11 to 14, shows lock means for locking the slide tray in the receded position, and is specifically a bottom view showing the casing of the main body portion of the equipment, with a portion being cut away.

Since the slide tray 3 has its foremost part protruded from the opening surface 7 of the casing of the main body portion, as shown in FIG. 9, the protruded portion can be held by hand for being pulled further forward. By pulling the protruded portion forward with a slightly larger force, the spring plate 5 is flexed for disengaging the roll 17 out of the engagement hole 19.

When the slide tray 3 has been pulled out to a pre-set pull-out position, that is to a position shown in FIG. 3, the roll 17 is engaged with the forward side engagement hole 20. The feeling of the roll 17 engaging with the engagement hole 20, or a "click" feeling, is imparted at this time to the hand so that the user is apprized of the fact that the slide tray 3 has been pulled out to a pre-set pull-out position.

Meanwhile, if the casing 2 is formed by an electrically conductive plate, but is plated, there is a risk that the electrical conduction with the roll 17 tends to be impeded by the plating film overlying the surface of the bottom plate 18. However, the material of the casing 2 is exposed on an end face of the cross-section (see enlarged lead-out views of FIGS. 5 and 8B) formed on punching the bottom plate 18 for forming the engagement holes 19, 20, so that, when the roll 17 is engaged with the engagement holes 19 or 20, the roll 17 comes in contact with the end face 22 thus assuring positive grounding. The engagement holes 19, 20 are preferably formed by punching from the lower side of the bottom plate 18. Specifically, by punching the bottom plate from the lower side, the end face 22 is directed obliquely upwards, as shown in the enlarged lead-out views of FIGS. 5 and 8, thus assuring positive contact between the end face 22 and the roll 17.

The lock means for locking the slide tray 3 in the housed position is hereinafter explained.

The lock means 23 includes an engagement member 24 provided on the casing 2, and a rotary lever 26 rotatably supported by the slide tray 3 and having an engagement portion 25 engageable with the engagement member 24. The rotary lever is rotatable between a position in which the engagement member 24 is engaged with the engagement portion 25 and a position in which the engagement member 24 is disengaged from the engagement portion 25. The lock means 23 also includes movement means 27 for rotating the rotary lever 26 and a dc motor 28 as a driving source for the movement means 27.

The engagement member 24 is pin-shaped and set upright towards the forward end on a lateral edge of the bottom plate 18 of the casing 2. The lower surface of a bottom wall section 29 of the slide tray 3 is formed with a recess 30 in register with a movement area of the engagement member 24. The recess 30 reaches the rear end of the slide tray 3. At the forward end of the recess 30 is formed a window 31 by partially removing the bottom wall section 29.

The rotary lever 26 is located inward of the bottom wall section 29 and is rotatably supported by a pivot shaft 32. On a lateral side towards the rear of the rotary lever 26 is formed the engagement portion 25 in the from of a cut-out. The portion of the lateral edge of the rotary lever 26 having the engagement portion 25 extending rearward from the mating engagement portion 25 is formed as an inclined lateral edge approaching the other lateral edge towards the distal end. The forward end of the rotary lever 26 is formed as a thrust piece 34 extending in a direction opposite to the side of the lever formed with the cut-out 25. The thrust piece 34 has its lateral edge 34a formed as a thrust lateral edge.

The movement means 27 is formed as a cam gear and rotatably supported on the inner side of the bottom wall section 29. On the rim side of the movement means 27 is formed an upstanding cam pin 35. A return spring 36 in the form of a coil spring is installed under tension between the rear end side of the rotary lever 26 and the slide tray 3, so that the rotary lever 26 is biased in a direction in which its thrust lateral edge 34a is caused to bear against the cam pin 35 of the movement means 27.

On the inner side of the bottom wall section 29 is secured the dc motor 28. On a rotary shaft 28a of the dc motor 28 is secured a worm 37 which is connected to the movement means 27 by two intermediate gears 38, 39. Specifically, the intermediate gears 38, 39 are rotatably supported on the inner side of the bottom wall section 29. A large gear of the intermediate gear 38, namely a worm wheel 38a, meshes with the worm 37, while a small gear 38b thereof meshes with a large gear 39a of the intermediate gear 39, a small gear 39b of which meshes with a gear 27a of the movement means 27. Thus, if the dc motor 28 is run in rotation, the movement means 27 is run in rotation.

Figure 11:
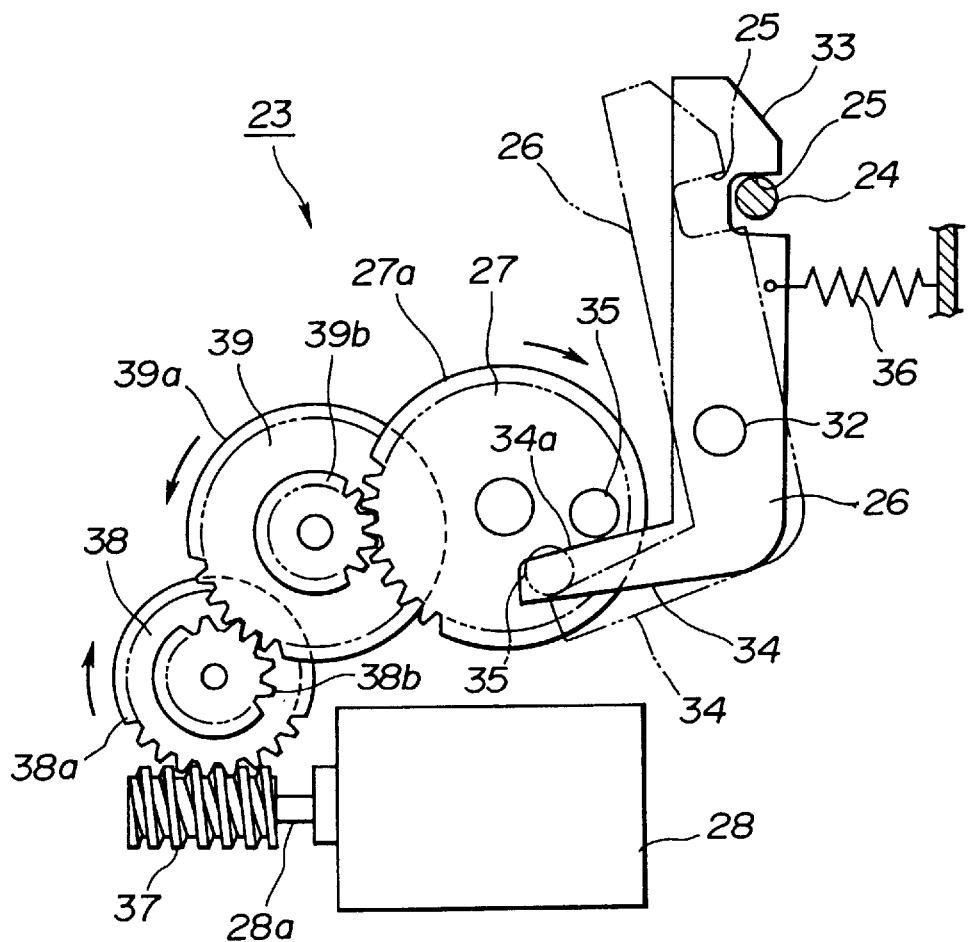
FIG. 11 is an enlarged plan view showing essential portions of the lock means.

The position of the rotary lever 26 shown by a solid line in FIG. 11 represents a locked position. In this state, the portion of the rotary lever 26 formed with the cut-out 25a is protruded via the window 31 in the bottom wall section 29 towards the front end of the recess 30. The engagement member 24 on the casing 2 is engaged with the engagement portion 25 of the rotary lever 26.

If, with the rotary lever 26 in the locked position, the dc motor 28 is driven for rotating the movement means 27 in a direction indicated by arrow in FIG. 11, the cam pin 35 is moved in unison therewith for thrusting the lateral edge 34a of the rotary lever 26. This rotates the rotary lever 26 counterclockwise in FIG. 11 up to an unlock position in which the engagement portion 25 is disengaged from the engagement member 24, as shown by a double-dotted line in FIG. 11. If the rotary lever 26 is rotated further until the cam pin 35 is disengaged from the thrust lateral edge 34a, the rotary lever 26 is returned to the lock position under the tension of the return spring 36. The dc motor 28 is halted when the cam pin 35 again has reached the solid-line position shown in FIG. 11.

Figure 12:
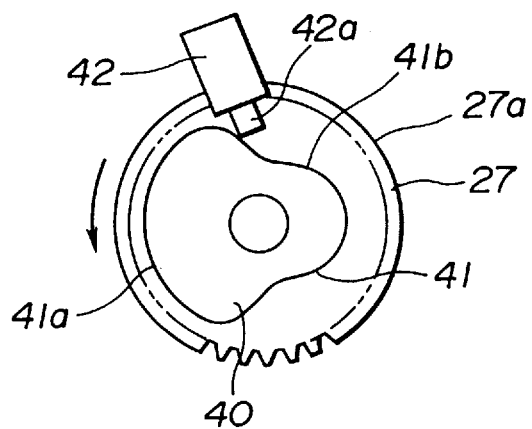
FIG. 12, taken together with FIG. 13, shows means for stopping the movement means at a fixed position, and specifically shows a surface formed with a cam protrusion of the movement means.
Figure 13:
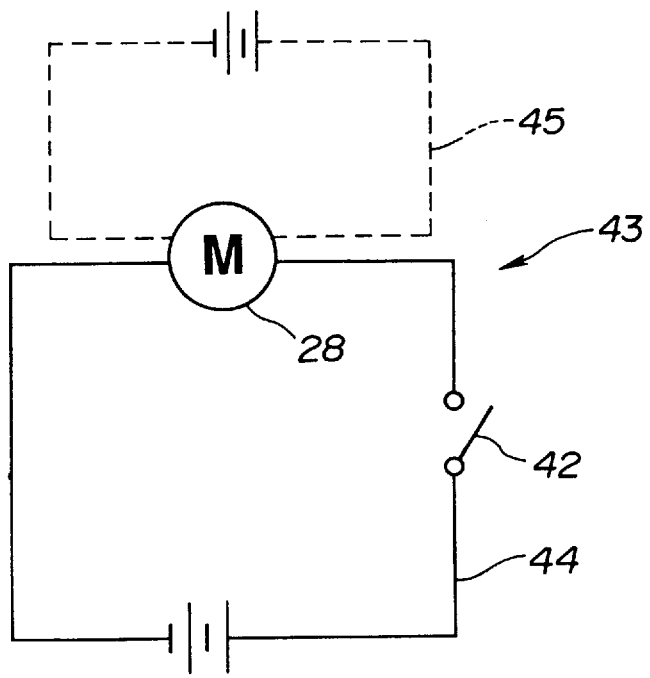
FIG. 13 is a schematic circuit diagram of the stop means.
Figure 14:
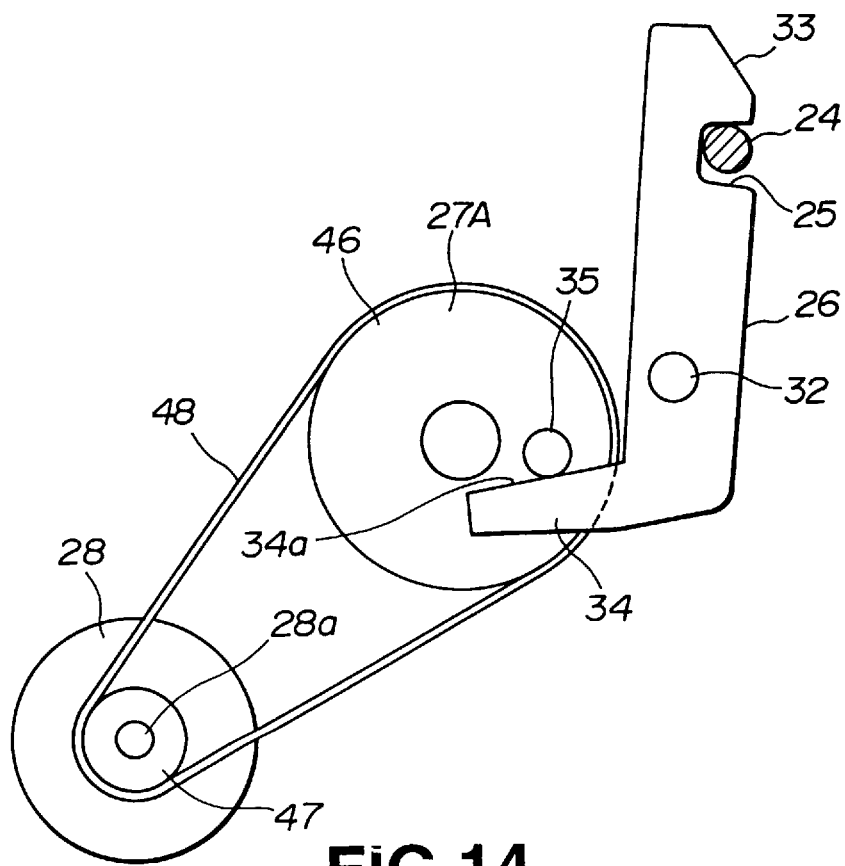
FIG. 14 is an enlarged plan view of a modified lock means.

As a typical means for stopping the movement means 27 at the above-defined position, that is at the lock position, cam means shown in FIG. 12 and a motor driving circuit shown in FIG. 13 may be employed.

On the opposite surface of the movement means 27 with respect to its surface carrying the cam pin 35 is formed a cam protrusion 40, the outer surface of which is a cam surface 41. The cam surface 41 has a thrusting portion 41a close to the outer periphery of the movement means 27 and a non-thrusting portion 41b towards the center of the movement means 27. A switch 42 is supported in proximity to the movement means 27 by the bottom wall section 29 of the slide tray 27 so that its actuating portion 42a faces the cam surface 41 of the cam protrusion 40. When the movement means 27 is rotated until the thrusting portion 41a of the cam surface 41 faces the actuating portion 42a, the actuating portion 42a is thrust by the thrusting portion 41a to turn on the switch 42. On the other hand, if the non-thrusting portion 41b of the cam surface 41 reaches the position facing the actuating portion 42a, the actuating portion 42a ceases to be thrust by the cam surface 41, so that the switch 42 is turned off.

A motor driving circuit 43 has two channels of circuits 44, 45. It is into the first circuit 44 that the switch 42 is inserted. With the cam pin 35 of the movement means 27 in a solid-line position in FIG. 11, the actuating portion 42a of the switch 42 is in a relative position with the cam surface 41 as shown in FIG. 12, with the actuating portion 42a of the switch 42 facing the non-thrusting portion 41b of the cam surface 41. Thus, the first circuit 44 is in the opened state.

If an ejection switch, not shown, provided on the front surface plate 5 of the slide tray 3 is thrust, the second circuit 45 is closed. Thus the current flows in the dc motor 28 which is rotated so that the movement means 27 starts to be rotated in a direction indicated by arrow in FIGS. 11 and 12. At this time, the actuating piece 42a of the switch 42 still faces the non-thrusting portion 41b of the cam surface 41, so that the switch is off and hence no current flows in the first circuit 44.

Therefore, if the rotary lever 26 is rotated by the cam pin 35 and the engagement member 24 is disengaged from the engagement portion 25 to permit the movement means 27 to be rotated a pre-set angle, the actuating piece 42a of the switch 42 is thrust by the thrusting portion 41a of the cam surface 41 to turn on the switch 42. The current now flows in the first circuit 44 which then causes rotation of the dc motor 28. Thus, the rotary lever 26 is rotated by the cam pin 35 and the engagement member 24 is disengaged from the engagement portion 25 against the tension of the return spring 36 to permit the slide tray 3 to be protruded outwards by the resilient force accumulated in the resilient member 14. Meanwhile, the current flowing in the second circuit 45 is designed to be interrupted after lapse of a pre-set time as from thrusting of the ejection switch, and is set so as to be interrupted directly after turning on of the switch 42. If the movement means 27 is rotated to the solid-line position in FIG. 11, the actuating piece 42a of the switch 42 faces the non-thrusting portion 41b of the cam surface 41, so that the switch 42 is turned off to open the first circuit 44 to halt the dc motor 28. In this manner, the movement means 27 is halted at all times with the cam pin 35 at the solid-line position shown in FIG. 11.

Although the cam 40 and the switch 42 are used as means for halting the movement means 27 at the pre-set position, a photodetector, for example, may be used in place of the switch 42.

In the above-described structure, the dc motor 28, as a driving source for rotating the movement means 27, and the movement means 27, are interconnected by gears 38, 39 and 27a. However, this is merely illustrative and is not limiting the present invention. For example, movement means 27A may be designed as a cam pulley having the cam pin 35 and an endless belt 48 may be provided between a pulley 46 and a driving pulley 47 secured to a rotary shaft 28a of the dc motor 28.

As the slide tray 3 is receded from the pull-out position shown in FIG. 3 into the inside of the casing 2, the engagement member 24 on the casing 2 perform a relative motion so that the engagement member 24 is moved forward in the recess 30 formed in the bottom surface of the slide tray 3.

When the engagement member 24 reaches the forward end of the recess 30, the engagement member 24 is caused to bear against the inclined lateral edge 33 of the rotary lever 26. If, from the point of abutment of the engagement member 24 against the inclined lateral edge 33, the engagement member 24 performs further relative movement, the engagement member 24 thrusts the inclined lateral edge 33 to rotate the rotary lever 26 in the unlock direction against the tension of the return spring 36, thus permitting the engagement member 24 to be rotated further forwards. When the engagement member 24 reaches the position in register with the engagement portion 25 of the rotary lever 26, the rotary lever 26 is returned by the return spring 36 to the lock position, whereby the engagement member 24 is engaged with the engagement portion 25 to lock the slide tray 3 in the receded position shown in FIG. 8.

The rear end of the ejection plate 9 has its rear end abutted against the rear surface plate 21 of the casing 2 and is receded further into the slide tray 3 as it extends the resilient member 14 for accumulating the resilient force in the resilient member 14.

If the ejection switch, not shown, is thrust as described above such that the rotary lever 26 is moved to the unlock position, the engagement member 24 is disengaged from the engagement portion 25. Thus the slide tray 3 has its forward end protruded forward from the opening surface 7 of the casing 2 under the spring force accumulated in the resilient member 14.

Figure 15:
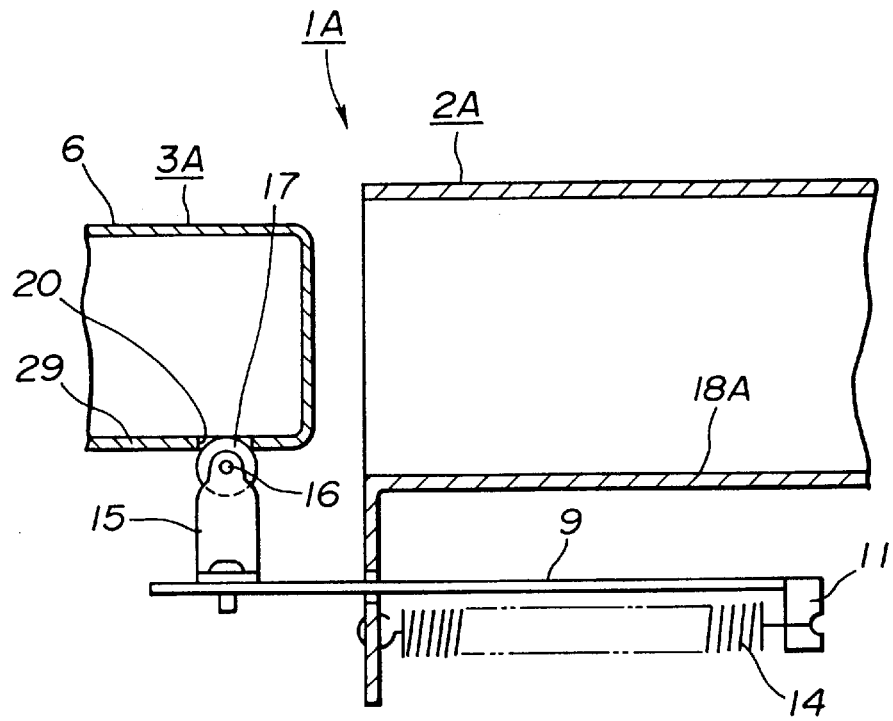
FIG. 15, taken together with FIG. 16, shows a second embodiment of a grounding structure in a slide tray of the present invention, and is specifically an enlarged cross-sectional view showing the slide tray having been pulled out of the casing of the main body portion.
Figure 16:
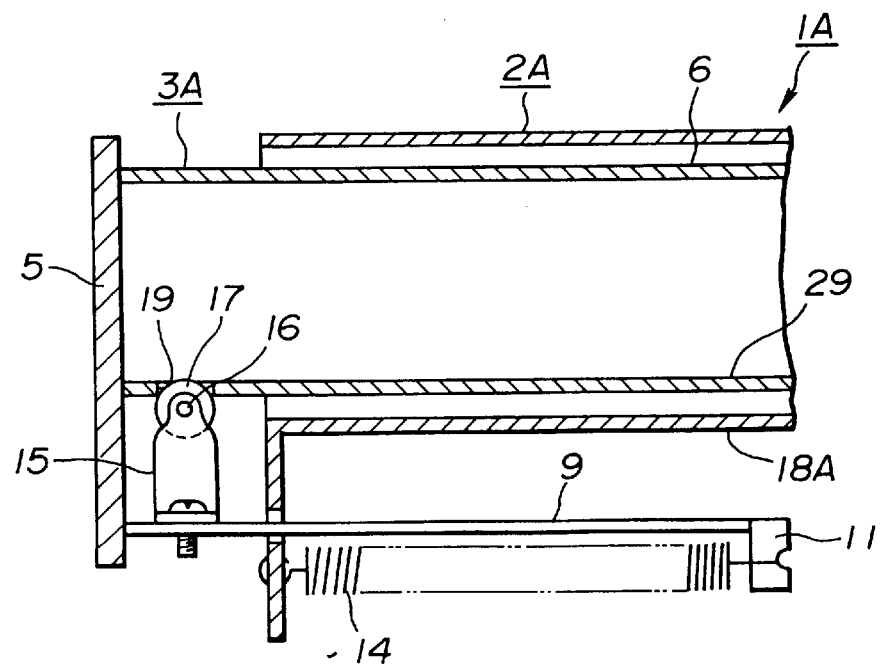
FIG. 16 an enlarged cross-sectional view showing the slide tray pulled out of the casing of the main body portion.

FIGS. 15 and 16 illustrate a second embodiment of the grounding structure for the electronic equipment according to the present invention.

Meanwhile, an optical disc reproducing apparatus 1A of the second embodiment differs from the optical disc reproducing apparatus of the first embodiment and is otherwise the same as the first embodiment. Therefore, only the different portions are explained in detail, while the remaining portions are denoted by reference numerals similar to those used in the first embodiment and the corresponding description is omitted for simplicity.

On a bottom plate 18A of a casing 2A of the main body portion is supported an ejection plate 9 for sliding movement in the fore-and-aft direction. The ejection plate 9 is biased in a direction of being popped out from the casing 2A by a resilient member 14 in the form of a coil spring installed under tension between a spring retainer 11 of the ejection plate 9 and the forward end of the casing 2A. In the state in which the ejection plate 9 is not thrust from the front side, the major portion of the ejection plate 9 is protruded from the front end of the casing 2A. The casing 2A is formed by an electrically conductive metallic plate such that the ejection plate 9 is kept in electrically conductive state with respect to the casing 2A.

On the forward end of the ejection plate 9 is supported a roll 17 via a spring plate 15. The roll 17 is designed to have a rolling contact with the lower surface of the bottom wall section 29 of the slide tray 3A.

At least the bottom wall section 29 of the slide tray 3A is formed by an electrically conductive metallic plate. The electrical components loaded on the slide tray 3A are grounded with respect to the bottom wall section 29. Specifically, the electrical components loaded on the slide tray 3A are grounded with respect to the casing 2A via bottom wall section 29 of the slide tray 3A, roll 17, spring plate 15 and ejection plate 9.

The forward end and the rear end of the bottom wall section 29 of the slide tray 3A lying on the path of travel of the roll 17 are formed engagement holes 19, 20, respectively.

If the slide tray 3A is receded into the casing 2A of the main body portion, the forward end of the ejection plate 9 is thrust by the forward surface plate 5 of the slide tray 3A, so that the ejection plate 9 is receded into the casing 2A. This extends the resilient member 14 while locking the slide tray 3A in the receded position. The roll 17 is engaged in the forward side engagement hole 19.

If the lock to the receded position is released, the ejection plate 9 is protruded forward under the spring force accumulated in the resilient member 14 for thrusting the forward surface plate 5 of the slide tray 3A, so that the forward end of the slide tray 3A is protruded outwards at the opening surface 7 of the casing 2A. However, since the roll 17 is engaged with the engagement hole 19, the slide tray 3A cannot be protruded beyond a value corresponding to the amount of protrusion of the ejection plate 9 from the forward end of the casing 2A.

If the portion of the slide tray 3A protruded from the opening surface 7 of the casing 2A is held by hand and pulled forwards, the slide tray 3A can be pulled out further from the casing 2A. With the roll 17 engaged in the rear engagement hole 20, the sense of "click" is imparted to the hand holding the slide tray 3A, so that the user can be apprized of the fact that the slide tray 3A has been pulled out to the pre-set position.

Although the present invention is applied in the above-described embodiments to an optical disc reproducing apparatus, it is to be noted that the present invention may be applied to an apparatus provided with a slide tray which can be pulled out of a casing of the main body portion of the apparatus and in which electrical components in need of grounding are loaded on the slide tray, such as a tape player.

What is claimed is:

1. An electrical apparatus, comprising:

a slide tray mounted on a casing of a main body portion of the apparatus for extraction forward from an opening surface of said casing and having loaded thereon electrical components in need of electrical input/output to the main body portion of the apparatus;

an electrically conductive portion provided on said casing;

an electrically conductive portion provided on said slide tray and electrically connected to said electrical components; and grounding means formed of an electrically conductive material, said grounding means being supported on one of the electrically conductive portion provided on said casing and the electrically conductive portion provided on said slide tray for sliding in the pull-out direction of said slide tray in an electrically conductive relation therewith, said grounding means being electrically contacted with the other of the electrically conductive portion provided on said casing and the electrically conductive portion provided on said slide tray when said slide tray has been pulled out from the casing, said grounding means including a roll having a rolling contact with the other of the electrically conductive portions provided on said casing and the electrically conductive portion provided on said slide tray and a spring for resiliently pressing said roll with said other of the electrically conducting portions.

2. The electrical apparatus as claimed in claim 1, wherein said grounding means includes an ejection plate supported on one of the electrically conductive portions provided on said casing and the electrically conductive portion provided on said slide tray for sliding in the pull-out direction of said slide tray in an electrically conductive relation therewith, and a resilient member for protruding said ejection plate towards said other electrically conductive portion.

3. The electrical apparatus as claimed in claim 2, wherein said resilient member includes a spring plate supported at a projecting end of said ejection plate and wherein a roll supported by said spring plate is resiliently pressed against said other electrically conductive portion under the spring force of said spring plate.

4. An electrical apparatus, comprising:

a slide tray mounted on a casing of a main body portion of the apparatus for extraction forward from an opening surface of said casing and having loaded thereon electrical components in need of electrical input/output to the main body portion of the apparatus, said casing having a bottom;

an electrically conductive portion provided on said casing;

an electrically conductive portion provided on said slide tray and electrically connected to said electrical components; and grounding means formed of an electrically conductive material, said grounding means supported on said bottom of said casing in an electrically conductive relation therewith, said grounding means being electrically contacted with the electrically conductive portion provided on said slide tray, said grounding means including a roll having a rolling contact with the electrically conductive portion provided on said slide tray and a resilient member for resiliently pressing said roll with said electrically conducting portion of said slide tray.

* * * * *